United States Patent [19]

Yamaoka et al.

[11] Patent Number: 4,882,940
[45] Date of Patent: Nov. 28, 1989

[54] POWER TRANSMISSION MECHANISM FOR TRACTOR

[75] Inventors: Kojiro Yamaoka, Nishinomiya; Toshiro Azuma, Minoo; Koichiro Fujisaki, Kobe; Hideaki Okada, Takarazuka, all of Japan

[73] Assignee: Kanzaki Kokyukoki Mfg. Co. Ltd., Japan

[21] Appl. No.: 306,223

[22] Filed: Feb. 3, 1989

Related U.S. Application Data

[63] Continuation of Ser. No. 872,478, Jun. 10, 1986, abandoned.

[30] Foreign Application Priority Data

Jun. 12, 1985 [JP] Japan .................................. 60-12881
Jul. 30, 1985 [JP] Japan .......................... 60-177646[U]
Aug. 20, 1985 [JP] Japan .......................... 60-127488[U]

[51] Int. Cl.4 ............................................ F16H 37/00
[52] U.S. Cl. .................................. 74/15.166; 74/15.6; 74/15.8
[58] Field of Search .................. 74/15.6, 15.63, 15.8, 74/15.84, 15.66, 15.86, 11, 15; 56/11.6

[56] References Cited

U.S. PATENT DOCUMENTS

| 2,922,320 | 1/1960 | Hutter | 74/15.6 |
| 2,981,012 | 4/1961 | Meyer | 74/15.86 |
| 3,430,438 | 3/1969 | Weiss . | |
| 3,687,212 | 8/1972 | Forster . | |
| 3,766,722 | 10/1973 | Kamlukin et al. | 56/11.6 |
| 4,304,141 | 12/1981 | Tone et al. | 74/15.66 |
| 4,366,877 | 1/1983 | Vissers et al. | 180/53 R |

Primary Examiner—Kenneth J. Dorner
Assistant Examiner—Gerald Anderson
Attorney, Agent, or Firm—Saidman, Sterne, Kessler & Goldstein

[57] ABSTRACT

The present invention provides a simple and compact power transmission mechanism for a tractor or similar vehicle having mounted thereto a mechanical attachment such as a lawn mower. The power transmission mechanism includes an engine which transmits driving power to ground engaging wheels through a driving power transmission unit and to the mechanical attachment through a driving speed changing unit positioned atop the transmission unit and operatively interconnected to the drive shaft thereof. The driving speed changing unit includes an input shaft which receives engine driving power for driving the drive shaft through a differential gear unit. Engine power is transmitted to the attachment through a belt from a power take-off unit coupled to the input shaft.

6 Claims, 7 Drawing Sheets

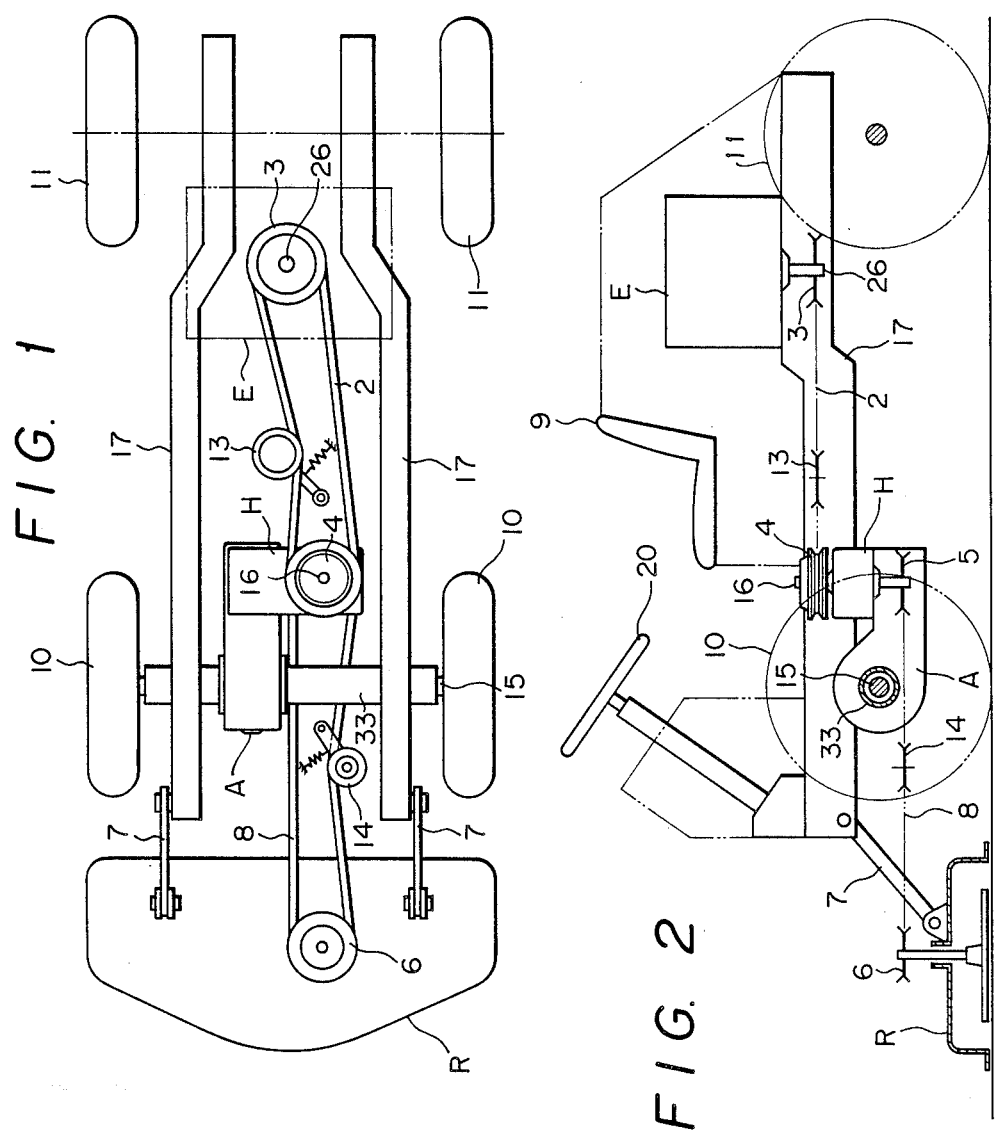

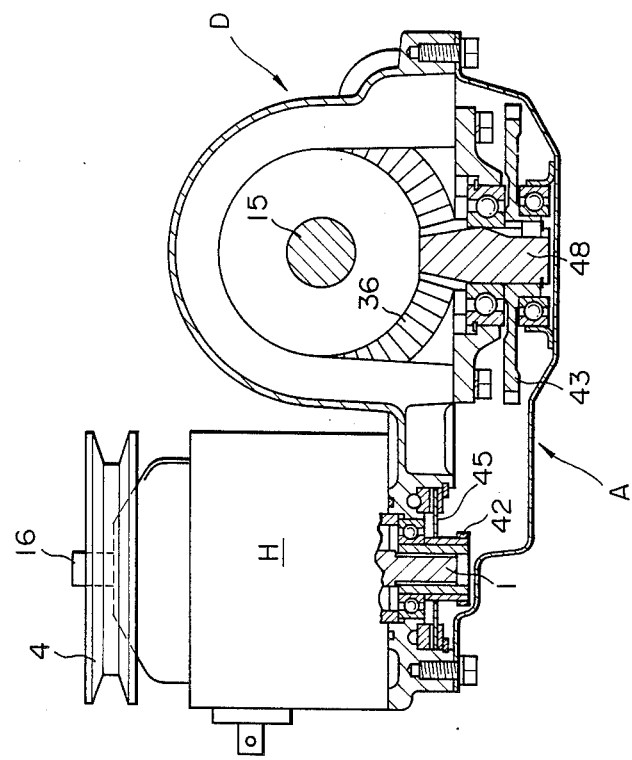
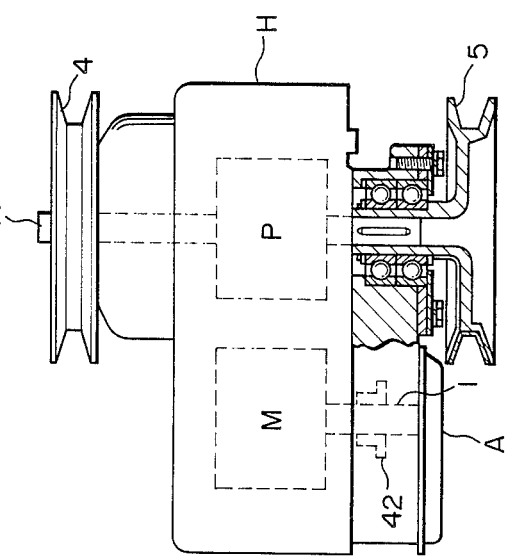
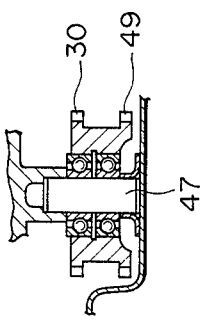
FIG. 6
FIG. 7
FIG. 8

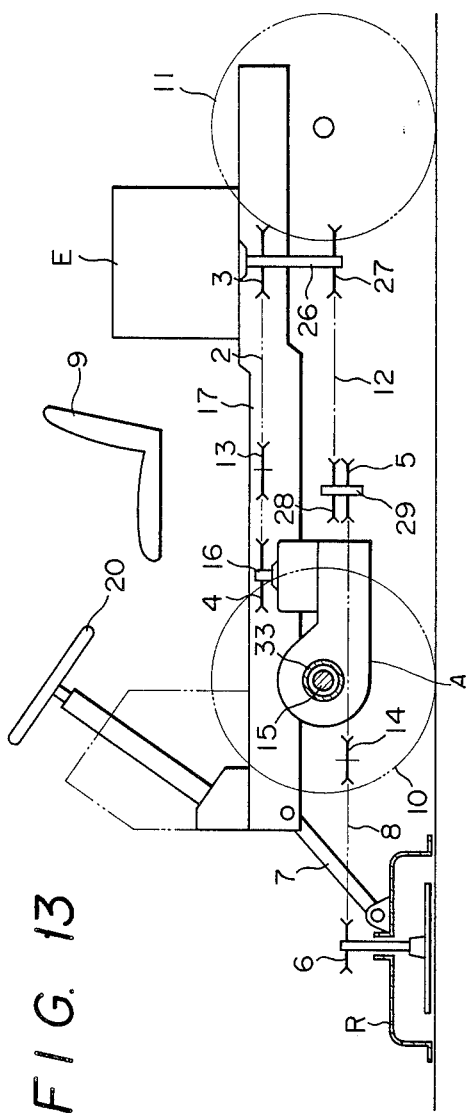
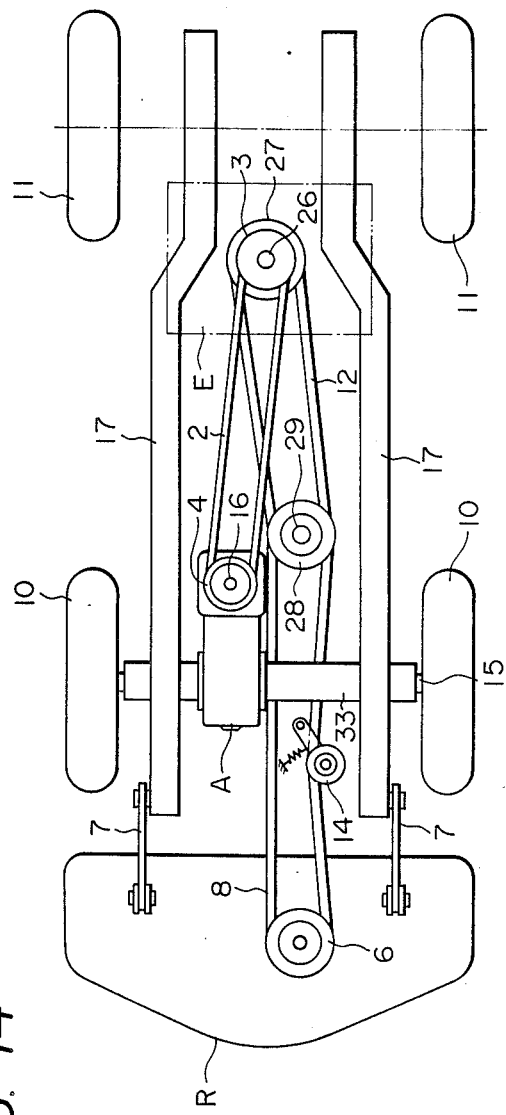
FIG. 13
FIG. 14

POWER TRANSMISSION MECHANISM FOR TRACTOR

BACKGROUND OF THE INVENTION

The small tractor provided with a mechanical attachment such as a mower and used exclusively for mowing lawn has been known from the past.

Examples of such tractors as above are shown in FIGS. 13, 14, and 15 of the attached drawings.

For these small tractors, it is necessary to transmit driving power from the engine to both the driving power transmission unit and the mower, the purpose being fulfilled by a structure composed of two systems. Accordingly, V-belts and V-pulleys are arranged in double steps under the tractor body while occupying a space for driving power transmission units and depriving the mower of space for lifting and lowering, thereby making the power transmission mechanism complicated.

The prior art disclosed in the U.S. Pat. No. 3,766,722, which is similar to the above-described art, is exemplary of such prior art tractors.

SUMMARY OF THE INVENTION

An object of this invention is to provide a mower-mounted small tractor of the simplest structure possible wherein driving power is transmitted from an engine to a driving power transmission mechanism and mower mainly through V-belts extending under the track body without the use of expensive universal joints or the like for connection so that the V-belts are not arranged in a plurality of steps thereby maximizing the space under the track body for enabling raising and lowering of the mower through wide range of motion.

For such purposes as above, a driving speed changing unit H is fixed to the top surface of a driving power transmission unit disposed along the longitudinal axis of the tractor in such a manner that an output shaft of the speed changing unit is inserted into the power transmission unit for driving the track axle through a differential gear unit whereas an input shaft is disposed sideways apart from the power transmission unit and provided with an input pulley secured thereto for transmitting power from the engine as well as with a power take-off unit for transmitting power to the mechanical attachment.

BRIEF DESCRIPTION OF THE DRAWINGS

The foregoing and other objects, aspects, uses and advantages of the present invention will be more fully appreciated as the same become better understood from the following detailed description of the present invention when considered in connection with the accompanying drawings, in which:

FIG. 1 is an overall plan view of a tractor according to this invention on which a mower is mounted at the front part (front-mounted);

FIG. 2 is a side view of the tractor depicted in FIG. 1;

FIG. 6 is a sectional view of a driving power transmission unit A having a shaft disposed vertically;

FIG. 7 is a sectional view of a part thereof including a counter shaft;

FIG. 8 is a front elevation of a part including the driving speed changing unit H;

DETAILED DESCRIPTION OF THE PREFERRED EMBODIMENTS

A description of structures of embodiments shown in the appended drawings will be made.

Figure 3:
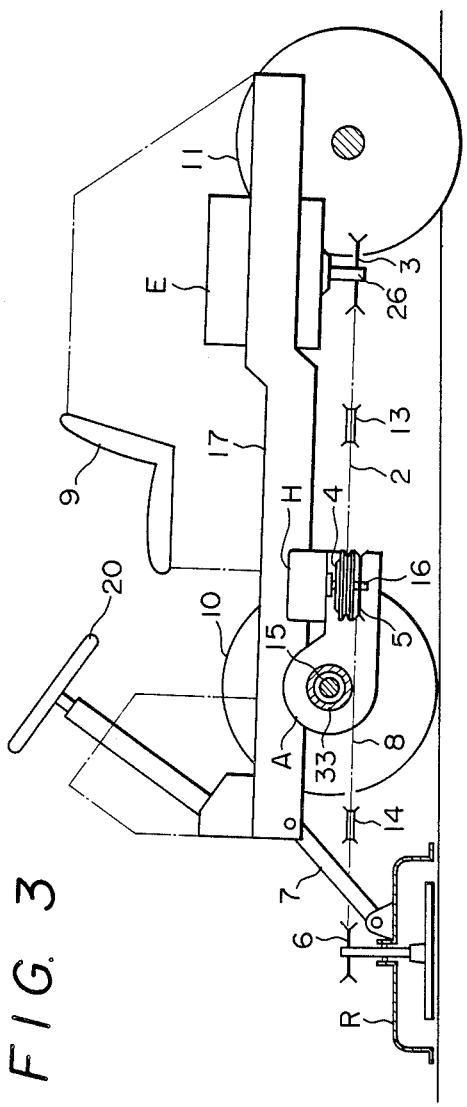
FIG. 3 is a side view of an embodiment of a tractor with an engine E mounted in a low position within the tractor.

FIGS. 1 through 3 show an embodiment of a tractor mounted with a mower R at the front part thereof, that is, a front-mount type tractor.

Tractor frame members 17 and 17 extend the length of the tractor from the front end to the rear and thereof. A steering wheel 20, driver's seat 9, and vertical output shaft type engine E are mounted on the tractor frame members 17 and 17. Front wheels 10 and rear wheels 11 support the tractor frame members 17 and 17. Front wheels 10 and rear wheels 11 are driving and directing wheels, respectively. The tractor includes mower R as a mechanical attachment vertically movably supported by lifting links 7 provided in front of the front wheels 10.

A driving power transmission unit A is stationarily fixed to the frame members 17 and 17, through which a common axle 15 having mounted thereon the front wheels 10 transversely extends. The driving power transmission unit A and an axle case 33 are fabricated integrally with each other and are arranged in the configuration of T. Further, an HST (Hydro-Static Transmission) type driving speed changing unit H is disposed on the driving power transmission unit A so that a line passing through the input and output shafts thereof may be parallel to the axle 15 extending transversely of the frame members 17, 17 and left. A differential gear unit (FIG. 4) is disposed in the driving power transmission unit A. The gear D produces differential revolutions in response to changing directional and rotational driving output of the output shaft 1 (FIG. 5) of the driving speed changing unit H to drive the axle 15 through a bevel gear unit.

The engine E is of a vertical output shaft type having a vertical crank shaft 26 to which an output pulley 3 is fixed. Driving power is transmitted from the output pulley 3, through a V-belt 2, to an input pulley 4 on an input shaft 16 provided in the driving speed changing unit H.

Driving speed of the input pulley 4, in the case of this embodiment, is steplessly changed by the driving speed changing unit H composed of the HST type speed changer, reduced by the driving power transmission unit A, and then drives the axle 15 extending transversely across the frame members 17, 17 via the differential gear unit D. A positional relation between the driving speed changing unit H and the driving power transmission unit A is such that the transmission unit A is fixedly disposed to slightly deviate from the crosswise center of the tractor body. Arranged on the longitudinal center line are a V-belt 2 extending between the engine E and the speed changing unit H and another V-belt 8 extending between the speed changing unit H and the mower R for power transmission therebetween. The driving power transmission unit A is positioned apart from the V-belt 8 and, for positioning the input pulley 4 alone in the central portion, an input shaft part 16 of the speed changing unit H is disposed so as to downwardly project from the driving power transmission unit A toward the crosswise center of the tractor body.

Input shaft 16 of the driving speed changing unit H comprises an upper portion and a lower portion. The upper portion and lower portion of input shaft 16 are preferably integral with each other. Input shaft 16 projects downwardly through the unit H. An output pulley 5 is disposed on the lower portion of shaft 16 whereby it is directly driven by the input shaft 16. Output pulley 5 is preferably fixed to the lower portion of shaft 16.

In the embodiments shown in FIGS. 1, 2, and 3, the input pulley 4 secured to the input shaft 16 is constructed to serve as a conventional electromagnetic clutch. A solenoid of the clutch, when turned on or off, can simultaneously turn on or off, respectively, driving power and mowing power together. Further, the downwardly projecting part of the input shaft 16 also serves as a power take-off shaft. The V-belt 8 is wound on the output pulley 5 and input shaft 6 for the mower for transmitting driving power to the mower R. The reference numerals 14 and 13 indicate a tension pulley for the V-belt 8 for the mower R and another tension pulley for tightening the V-belt 2.

The embodiment shown in FIG. 3 having the vertically depending output shaft type engine E mounted between the track frames 17 also provides that the engine is disposed lower than the track frames 17 and, in this case, an input pulley 4 and output one 5 are fixed to the projecting part of the input shaft 16 while positioned close to each other.

Figure 4:
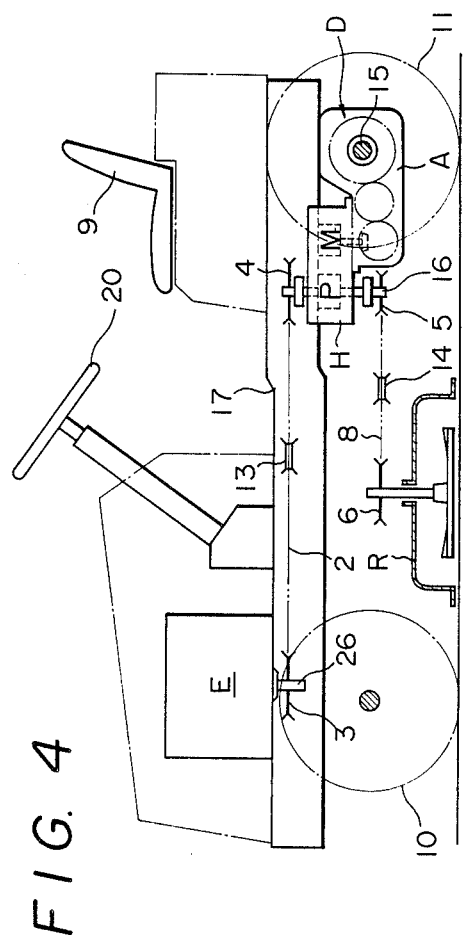
FIG. 4 is a side view of an embodiment of a tractor having a mower mid-mounted.

An embodiment of tractor of mid-mount mower type as shown in FIG. 4 will now be described.

An engine E is disposed on the front part of the tractor body and a steering wheel 20 in the rear of the engine with a driver's seat 9 positioned in the rear thereof. Rear wheels 11 are used for driving whereas front wheels 10 for directing.

A mower R is mounted on the middle part of the track body. In this structure, an axle 15 is used for the rear wheels, whereby a driving power transmission unit A and a driving speed changing unit H are arranged to correspond thereto.

An input shaft 16 of the speed changing unit H is adapted to project vertically and an input pulley 4 is fixed to the upwardly projecting part of the input shaft. A V-belt 2 extends between the input pulley and an output pulley 3, which is fixed to the crank shaft 26 of the engine E.

An output pulley 5 for the mower is fixed to the downwardly projecting part of the input shaft 16 and a V-belt 8 extends from the output pulley 5 to an input pulley 6 for the mower R.

Figure 5:
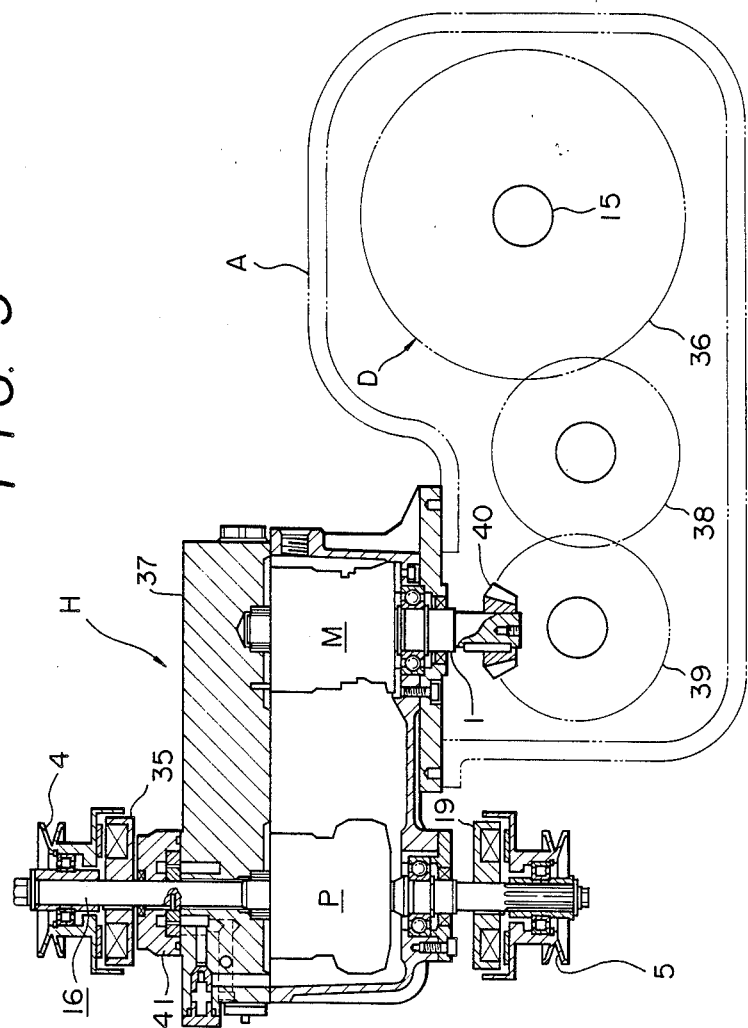
FIG. 5 is a sectional view of a part including a driving speed changing unit H and a driving power transmission unit A.

With reference to FIG. 5, the driving speed changing unit H is also composed of the HST type speed changer.

The driving speed changing unit H drives an oil hydraulic pump P through the input shaft 16 and pressure oil discharged from the hydraulic pump P is fed to the hydraulic motor M through the oil passage plate 37. A driving shaft 1 supporting the hydraulic motor M is adapted to project downwardly and is provided with a bevel wheel 40 at the end thereof. 41 represents a charge pump. The quantity of discharged oil varies according to the degree of turn of a slant plate of the hydraulic pump P and variation in quantity of discharged oil changes the speed of the hydraulic motor M.

On the other hand, the driving power transmission unit A is provided with reduction gears 38 and 39 each fixed to an axle extending transversely across the track body and contained in the case thereof. The the differential gear unit D is mounted on the axle 15. An opening is provided on the top of the power transmission unit A so that the speed changing unit H may be mounted in position with the output shaft 1 thereof inserted through this opening.

The bevel wheel 40 is driven by the output shaft 1 of the hydraulic motor M, which has been subjected to speed changes, and drives a ring gear 36 of the differential gear unit D through the reduction gears 39 and 38.

An electromagnetic clutch unit 35 is interposed between the upper end of the input shaft 16 and the input pulley 4 and another electromagnetic clutch unit 19 between the lower end of the same shaft 16 and the output pulley 5 for the mower.

In the driving power transmission units in the embodiments shown in FIGS. 6, 7, and 8, power is transmitted through a vertical shaft and horizontally disposed spur gears.

In other words, a brake device 45 and a spur gear 42 are fixed to the lower end of the output shaft 1, the spur gear 42 being adapted to mesh with the other spur gear 30 secured to the counter shaft 47 as shown in FIG. 7. A first twin spur wheel meshes with a second spur wheel 43 fixed to the pinion shaft 48 so as to drive the ring gear 36 of the differential gear unit D by the pinion shaft 48.

In this embodiment, a part of the case of the driving power transmission unit A is extended to the bottom of the input shaft 16 of the speed changing unit H and pivotally supports the input shaft 16 which has been inserted into the case. Bending force exerted on the input shaft 16 by the output pulley for the mower R is borne by the case of the driving power transmission unit A so as to reinforce the input shaft 16 and eliminate one of the prior art disadvantages caused by the action of a bending force acting upon the bearing part of the driving speed changing unit H.

Figure 9:
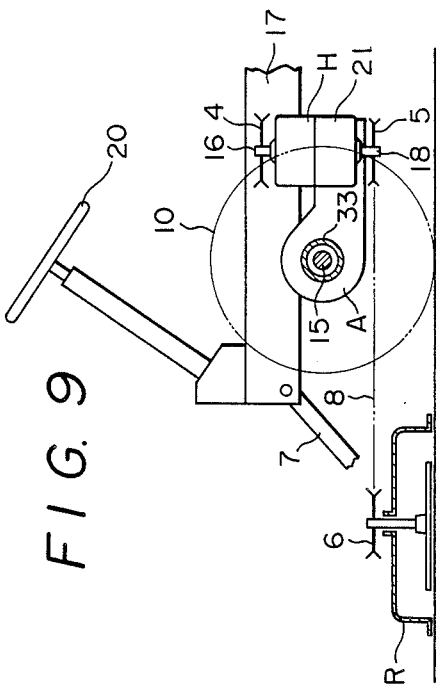
FIG. 9 is a side view of an embodiment having a PTO unit to which a reduction gear unit is fixed.
Figure 10:
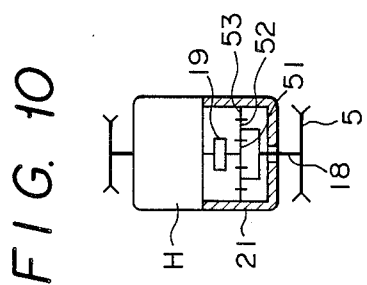
FIG. 10 is a sectional view of the reduction gear unit.

FIG. 9 is a side view of an embodiment provided with a reduction gear unit and a clutch unit, a reduction gear case 21 of the reduction gear unit being shown in FIG. 10.

In this embodiment, the reduction gear case 21 is fixed to the underside of the driving speed changing unit H. Revolutions of the input shaft 16 are further reduced in the reduction gear case 21 and taken off by the power take-off shaft 18. Also, an electromagnetic clutch unit 19 is incorporated into the reduction gear unit 21. The reduction gear unit includes a planetary gear system composed of a sun gear 51, planet gear 52, and internal gear 53.

Figure 11:
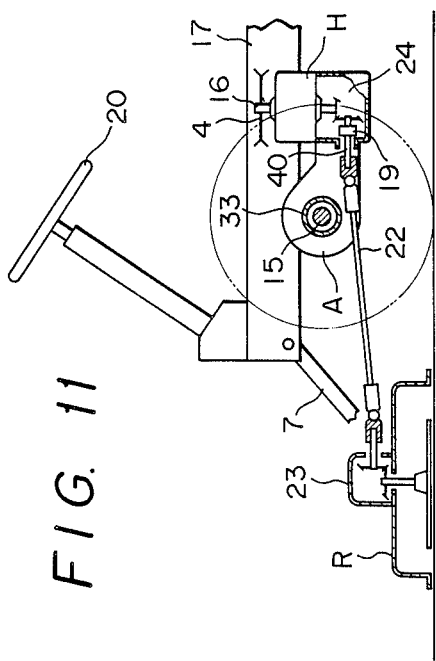
FIG. 11 is a side view of an embodiment in which a bevel gear box is provided for the PTO unit to drive the mower through a universal joint shaft.

FIG. 11 is a side view of an embodiment having a horizontal power take-off shaft 40.

In this structure, a bevel gear box 24 is fixed to the underside of the driving speed changing unit H for changing the rotational direction. In other words, differently from the horizontal PTO shaft hitherto described, a PTO shaft in this embodiment is adapted to extend horizontally by the bevel gear box 24 and inputs power into an input gear box 23 of the mower R through a universal joint shaft 22.

Figure 12:
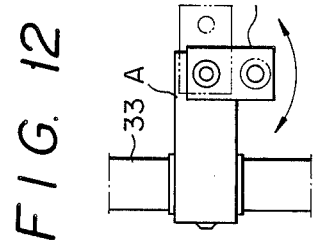
FIG. 12 is a plan view of an embodiment in which the driving speed changing unit H is rotatable relative to the driving power transmission unit A; and, FIGS. 13, 14, and 15 are views showing tractors of conventional structure.

FIG. 12 is a plan view of an embodiment in which a driving power transmission unit A and a driving speed changing unit H are structurally independent from each other and the speed changing unit H is made rotatable for change of position thereof.

In this structure, the driving speed changing unit H is selectively made rotatable for changing the position of the input shaft 16.

The prior art applied to tractors shown in FIGS. 13, 14, and 15 will be described hereunder.

FIGS. 13 and 14 show a tractor according to the prior art such as provided with a mower at the front part thereof, wherein an engine E is disposed on the rear part of the track body because of a driver's seat disposed in the front part. As the first step, an output pulley 3 is fixed to the crank shaft 26 of the engine E for extending a V-belt 2 therefrom to the input pulley 4 of the power transmission unit A which drives the front wheels of the tractor. The crank shaft 26 extends downwardly so as to be provided with an output pulley 27 for driving the mechanical attachment, whereby a first V-belt 12 for the mechanical attachment is extended from the output pulley 27 to an input pulley 28 fixed to the upper part of a counter shaft 29 located in an approximate middle position of the track body whereas a second V-belt 8 is extended between an output pulley 5 fixed to the counter shaft 29 and an input pulley 6 of the mechanical attachment. Thus, V-belts 2 and 12 are extended above and below in a space between the track frames 17, thereby making internal mechanisms complicated and lowering efficiency of servicing such as maintenance and checkup. In addition, a space for providing the counter shaft 29 between the track frames 17 is required.

Figure 15:
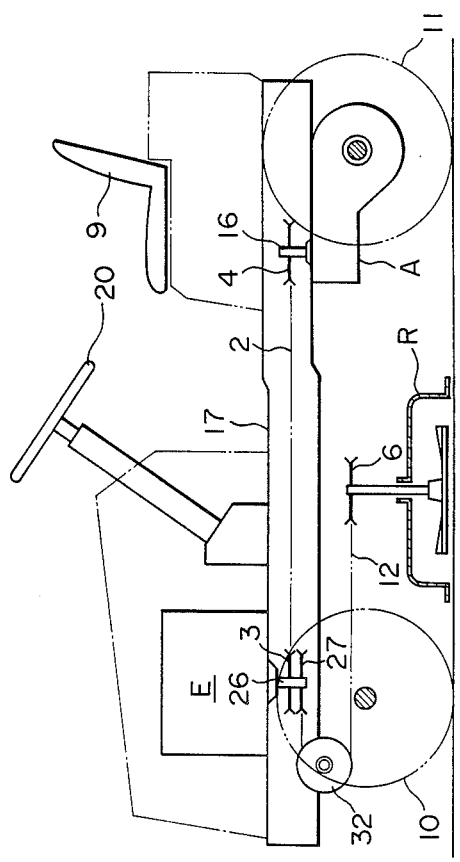

FIG. 15 shows a conventional tractor mounted with a mower at the bottom middle part thereof. In this case, too, an output pulley 27 for the mechanical attachment is fixed to the lower end of a crank shaft 26 of the engine E and a V-belt 12 wound on the output pulley 27 must be applied to an input pulley 6 of the mower R in an improper manner through a counter pulley 32, which turns the V-belt 12 through 90° to make the coupling with the input pulley 6.

At any rate, conventional structures as shown in FIGS. 13, 14, and 15 having V-belts, a counter shaft, and V-belts and pulleys complicatedly arranged in the track body decrease the efficiency of service as maintenance and checkup. Such a tendency as above becomes more significant as a mower-mounted tractor is made smaller in size.

As heretofore described, FIGS 13, 14, and 15 were referred to for the description of the prior art.

Structures according to the present invention exhibit such beneficial effects as described below.

First, a V-belt 2 extended from the crank shaft 26 of the engine E to the input shaft 16 of the driving speed changing unit H is used for the power transmission system for the mower R and, therefore, eliminates a need to provide two lines of V-belts for driving the mower R separately from the drive wheels of the tractor, as is the case with the prior art tractors as shown in FIGS. 13 and 14.

Secondly, the prior art tractors require a counter shaft 29 for supporting a counter pulley 28 or 32 to drive the mower R and requires space to receive the shaft and the pulley in a narrow region defined between the frame members 17 and 17. However, according to the present invention, an input shaft 16 of the driving speed changing unit H secured to the driving power transmission unit A mounted on the frame members 17 and 17 is provided in lieu of the counter shaft 29, thereby enabling a more simple structure to be provided between the frame members 17 and 17. Thus, in spite of an arrangement to transmit driving power from the engine E to both the power transmission unit and the mechanical attachment, a tractor of simple structure permitting easy maintenance and checkup is ensured by this invention.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the attached claims.

What is claimed is:

1. A power transmission mechanism, comprising:
   a hydrostatic transmission including an input shaft for driving said hydrostatic transmission, and an output shaft;
   said input shaft having an upper driven portion and a lower portion which project through said hydrostatic transmission;
   a transmission mechanism for transferring power from said output shaft;
   a power take-off unit for driving a mechanical attachment about a substantially vertical axis, said power take-off unit being disposed on said lower portion of said input shaft, wherein said power take-off unit is directly driven by said input shaft.

2. A power transmission mechanism of claim 1, wherein said power take-off unit comprises rotating means for transferring power to said mechanical attachment wherein said rotating means and said input shaft rotate around a common axis.

3. A power transmission mechanism according to claim 1, further comprising a clutch unit, said clutch unit being interposed between said input shaft and said power take-off unit.

4. A power transmission mechanism according to claim 3, further comprising a reduction gear unit, said clutch unit and said reduction gear unit being interposed between said input shaft and said power take-off unit.

5. A power transmission mechanism according to claim 1, wherein said power take-off unit comprises a bevel gear box and a power take-off shaft extending substantially parallel to said longitudinal axis of the tractor, said power take-off shaft being coupled to a universal joint shaft extending between said power take-off unit and said mechanical attachment so that engine driving power is transmitted to said mechanical attachment through said universal joint shaft.

6. A power transmission mechanism, comprising:
an axle;
a differential gear unit for driving said axle;
a hydrostatic transmission including an input shaft for driving said hydrostatic transmission, and an output shaft;
said input shaft having an upper driven portion and a lower portion which project through said hydrostatic transmission;
a transmission mechanism for transferring power from said output shaft to said differential gear unit;
a power take-off unit for driving a mechanical attachment wherein said mechanical attachment rotates around an axis that is substantially vertical, said power take-off unit comprising rotating means for transferring power to said mechanical attachment;
said power take-off unit being disposed on said lower portion of said input shaft, wherein said power take-off unit is directly driven by said input shaft; and
wherein said rotating means and said input shaft rotate around a common axis.

* * * * *

UNITED STATES PATENT AND TRADEMARK OFFICE
CERTIFICATE OF CORRECTION

PATENT NO. : 4,882,940
DATED : November 28, 1989
INVENTOR(S) : Yamaoka et al.

It is certified that error appears in the above-identified patent and that said Letters Patent is hereby corrected as shown below:

Title page:

in the section entitled "FOREIGN APPLICATION PRIORITY DATA", first-listed priority document, delete "60-12881" and insert -- 60-128881 -- therefor; and second-listed priority document, delete "60-177646[U]" and insert -- 60-117646[U] -- therefor.

Signed and Sealed this

Twentieth Day of August, 1991

*Attest:*

HARRY F. MANBECK, JR.

*Attesting Officer*     *Commissioner of Patents and Trademarks*